United States Patent
Hormann

(10) Patent No.: US 7,182,904 B2
(45) Date of Patent: Feb. 27, 2007

(54) LOW PRESSURE LAMINATE GAS ASSIST MOLDING

(75) Inventor: Gregory A. Hormann, Canton, MI (US)

(73) Assignee: Lear Corporation, Southfield, MI (US)

(*) Notice: Subject to any disclaimer, the term of this patent is extended or adjusted under 35 U.S.C. 154(b) by 602 days.

(21) Appl. No.: 10/707,591

(22) Filed: Dec. 23, 2003

(65) Prior Publication Data

US 2005/0133967 A1 Jun. 23, 2005

(51) Int. Cl.
*B29D 22/00* (2006.01)

(52) U.S. Cl. ...................... 264/516; 264/572
(58) Field of Classification Search ............... 264/516, 264/572
See application file for complete search history.

(56) References Cited

U.S. PATENT DOCUMENTS

| | | | | |
|---|---|---|---|---|
| 4,968,474 A | * | 11/1990 | Ito | 264/513 |
| 5,277,865 A | * | 1/1994 | Hara et al. | 264/516 |
| 6,506,335 B1 | * | 1/2003 | Matsumoto et al. | 264/513 |

* cited by examiner

*Primary Examiner*—Suzanne E. McDowell
(74) *Attorney, Agent, or Firm*—Earl LaFontaine; Artz & Artz, P.C.

(57) ABSTRACT

A system and process for gas-assisted injection molding of plastic materials to form laminate-type products. A laminate material is positioned in a mold and the mold is closed to a pre-set position, leaving a gap. Plastic material is injected into the mold cavity onto the laminate material, and gas is injected into the plastic material. Thereafter, the mold is closed, compressing the gas in the plastic material. Once the process is complete and the plastic has cooled, the gas is vented from the molded component, the mold is opened, and the completed molded part is removed.

14 Claims, 3 Drawing Sheets

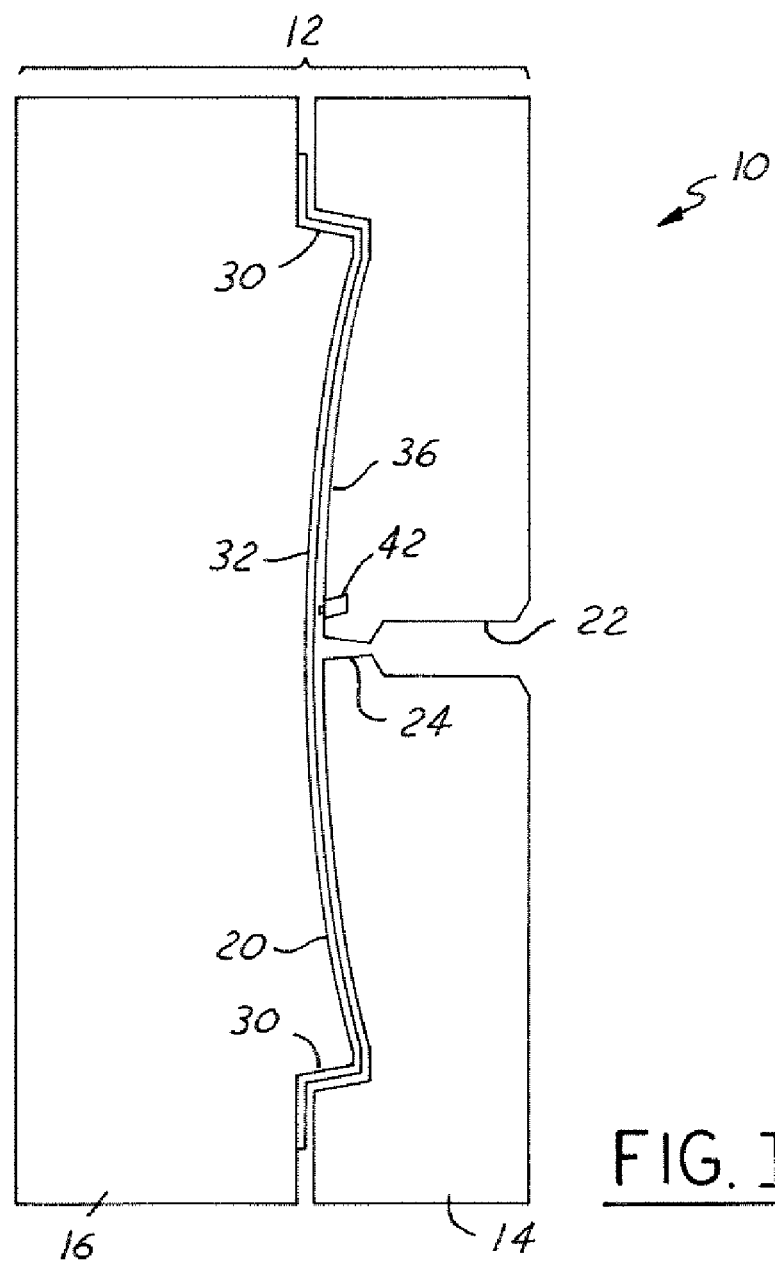
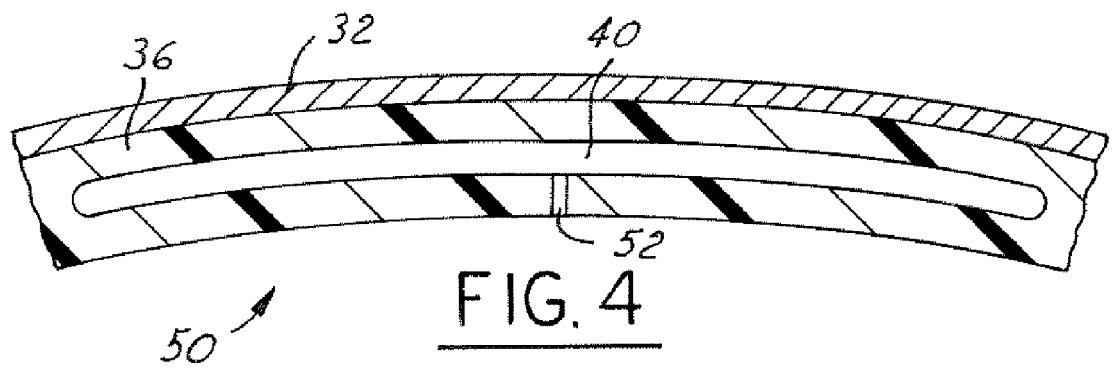

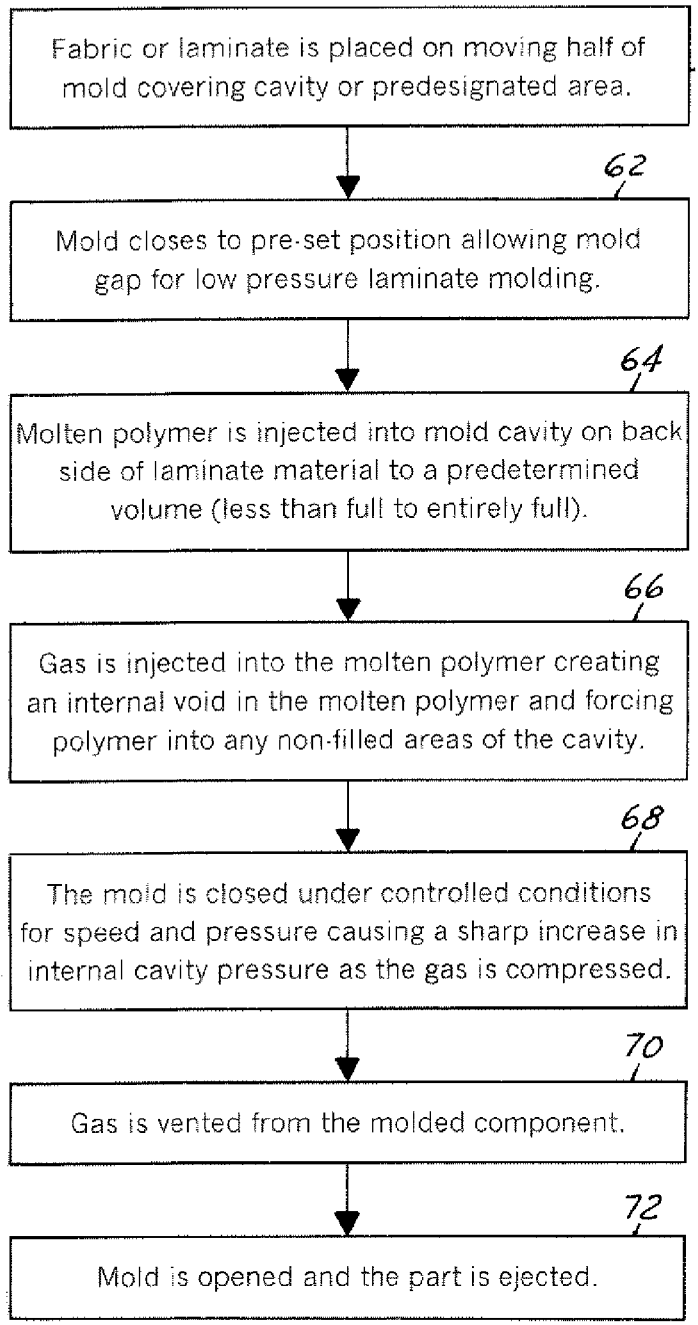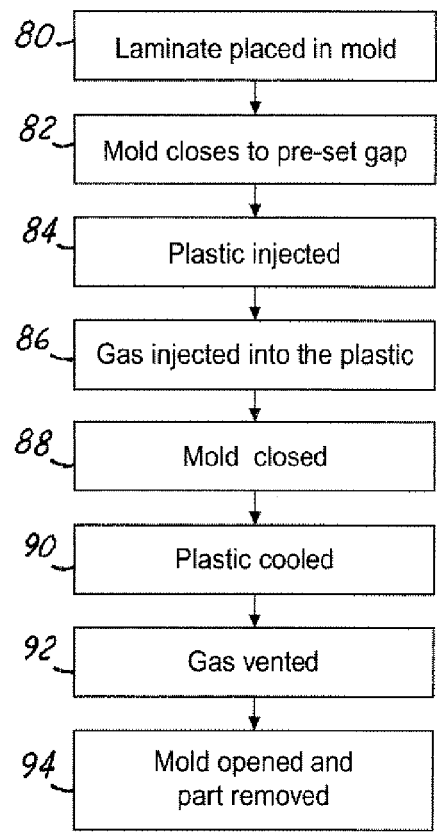
FIG. 7
FIG. 8

LOW PRESSURE LAMINATE GAS ASSIST MOLDING

BACKGROUND OF INVENTION

The present invention relates generally to plastic injection molding systems and more particularly to gas-assisted plastic injection molding systems and processes.

There are numerous known systems for plastic injection molding. In conventional plastic injection molding systems, plastic pellets are melted in an injection molding machine and advanced by a screw ram into a mold cavity. The mold cavity is formed between two mold halves (a stationary core member and a moveable cavity member) typically through one or more sprue bushings, a manifold and/or a hot runner system.

The two halves of the mold are clamped together and the plastic is injected into the mold cavity. The molten plastic material in the cavity is allowed to cool and harden in the cavity, typically by a cooling system which circulates a cooling fluid through one or more of the mold members. When the part is sufficiently hardened, the mold is opened and the part removed, typically by use of one or more ejector pins.

Some of the known systems utilize a gas in the injection molding process and are commonly known as "gas-assisted injection molding systems." In these systems, the gas is injected into the molten plastic material through the plastic injection nozzle itself or through one or more pin mechanisms strategically positioned in the mold, sprue bushings, manifolds, or hot runner systems. It is also possible to inject the gas directly into the molten plastic in the barrel of the injection molding machine. The gas, which typically is an inert gas, such as nitrogen, is injected under pressure and forms one or more hollow cavities or channels in the molded part. The benefits of gas-assisted injection molding processes are well-known, and include the cost savings through the sue of less plastic material, producing parts which are lighter in weight, and producing parts which have better surface definitions and finishes. Also, the hollow parts have thinner wall members and thus cool in a faster manner, thereby increasing production output.

Another plastic injection molding system which utilizes gas injects the gas into the mold cavity along one or more exterior surfaces of the molded part. The pressurized gas forces the plastic against the opposite surface or surfaces of the mold cavity and forms a part with superior surface characteristics on the appearance surfaces. On the non-appearance or "backside" of the part, this system and process typically leaves numerous visual defects.

It is also known to create a laminate product in which a piece of fabric or the like is positioned in the mold and the plastic material is injected or formed on the fabric. This process typically uses a structural foam as the plastic material.

Although many of these plastic injection molding systems and processes operate satisfactorily and have produced commercially acceptable plastic injection molded parts and components, including laminate-type components, there is a need for improved systems and processes, particularly those which can produce a superior product, a less costly product, or a product which can be manufactured in a faster and more efficient manner.

SUMMARY OF INVENTION

It is an object of the present invention to provide an improved plastic injection molding system and process for producing a laminate-type product. It is another object of the present invention to provide an improved "gas-assisted injection molding" system and process for producing a laminate-type product. It is still another object of the present invention to provide an improved gas-assisted injection molding process and system for producing laminate-type products which reduces the number of bushings for large products and which minimizes or eliminates weld lines.

It is a further object of the present invention to provide a gas-assisted injection molding system and process for producing laminate-type products which has less mold complexity and expense.

In accordance with the present invention, a mold is utilized in which a fabric or other laminate material is placed in the moving half of the mold, and the mold is closed leaving a small gap between the mold halves. A predetermined volume of molten plastic is injected into the mold cavity onto the backside of the laminate material. Gas is then injected into the molten plastic creating one or more internal voids and forcing the plastic material into all of the areas of the cavity.

Thereafter, the mold is closed under controlled conditions for speed and pressure which causes an increase in the internal cavity pressure as the gas is compressed. Once the plastic material has cooled and is self-supporting, the gas is vented from the molded products.

Finally, the mold is opened and the part is removed from the mold cavity. Preferably, one or more ejector pins are utilized to assist in removing the part from the mold.

Other embodiments, benefits and features of the present invention will become apparent from the following description of the invention when viewed in accordance with the accompanying drawings and appended claims.

BRIEF DESCRIPTION OF DRAWINGS

FIG. 1 is the schematic illustration of a preferred embodiment of the present invention.

FIG. 4 is a cross-section of the product shown in FIG. 3, the cross-section being taken along lines 4—4 in FIG. 3.

FIG. 7 is a flow diagram depicting a process in accordance with the present invention.

FIG. 8 is another flow diagram depicting a process in accordance with the present invention.

DETAILED DESCRIPTION

Figure 2:
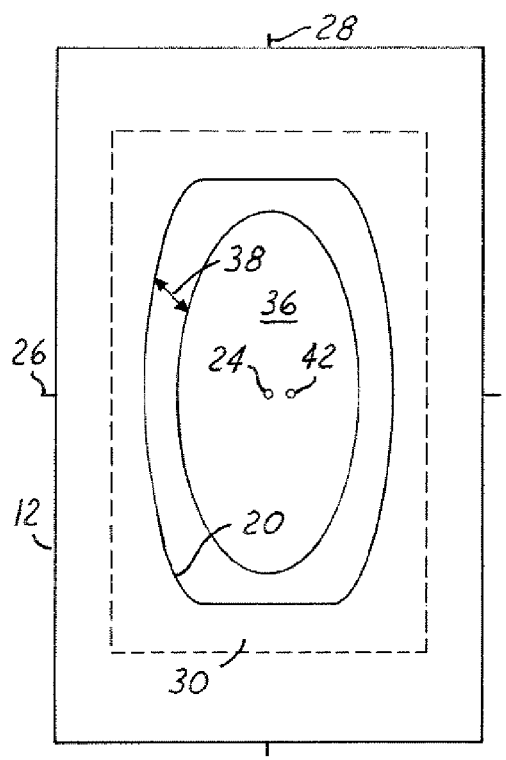
FIG. 2 illustrates a step in a process in accordance with the present invention.

The drawings herein illustrate the unique and inventive process and system for use of gas-assisted injection molding to produce laminate-type materials. A preferred embodiment of the present invention is shown in FIGS. 1–4 and indicated generally by the reference numeral 10. The embodiment 10 includes a mold 12 which has a stationary mold member 14 and a moveable mold member 16. As commonly understood in the art, the stationary mold member is typically referred to as the "core" mold member while the moveable mold member is typically referred to as the "cavity" mold member.

A cavity 20 is formed in the mold 12 between the two mold members 14 and 16. The cavity 12 is formed and machined in the precise shape of the final plastic component or part to be manufactured. In this regard, the cavity 12 shown in the drawings is merely exemplary of the many sizes, shapes, and types of mold cavities which can be utilized with the present invention.

Figure 3:
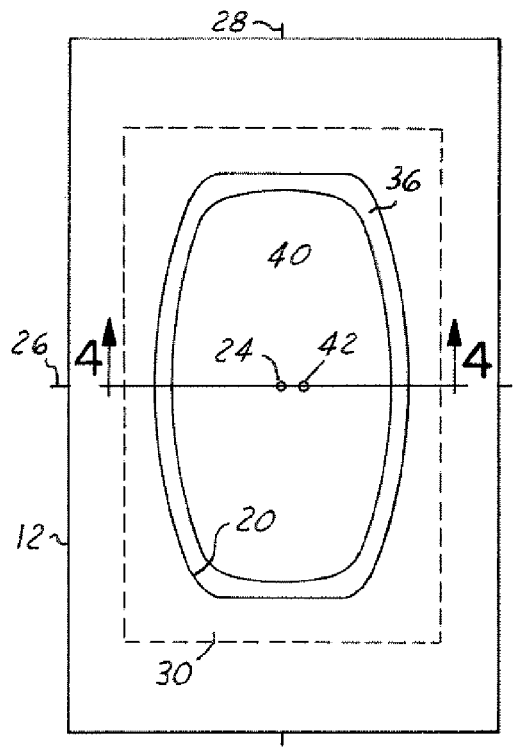
FIG. 3 illustrates another step in a process in accordance with the present invention.

An injection molding machine (not shown) is positioned adjacent the mold 12 and includes a nozzle member or the like which is positioned in the recess 22 in the mold member 14. Typically, a bushing member (not shown) is positioned in the recess 22 and used to pass molten plastic material from the injection molding machine to the mold cavity. In accordance with conventional injection molding processes, molten plastic material is melted in the injection molding machine and then injected through the nozzle or bushing and into the mold cavity 20 in the mold 12. The plastic material is injected into the mold cavity 20 through an orifice or opening 24. In this regard, the orifice or opening 24 in which the plastic material is injected into the mold cavity 20, is positioned substantially in the center of the mold cavity. As shown in FIGS. 2 and 3, the orifice 24 is positioned substantially at the intersection of center lines 26 and 28 of the mold 12. It is understood, of course, that the plastic material can be injected into the mold cavity from one or more other locations. However, a centrally located plastic injection orifice or opening assists in uniformly and evenly distributing the plastic material throughout the mold cavity.

As shown in FIG. 1, the mold cavity 20 has a shear edge 30 which is positioned around the periphery of the mold cavity. The molding process utilized preferably is compression injection molding. The use of shear edges are known in the art and provide limit-type boundaries for the spread of the molten plastic material in the mold.

Preferably, shut-off valve mechanism (not shown) is positioned in the bushing or other member which is positioned in the recess 22 in mold member 14. Any integral-type of mechanical shut-off valve which can be utilized with the present invention is shown in U.S. patent application Ser. No. 10/707,613, filed on Dec. 24, 2003 and entitled "Mechanical Shut-Off Value for Gas-Assist Injection Molding" (LC 0145 PUS), the disclosure of which is hereby incorporated by reference herein.

A fabric or other laminate-type material 32 is positioned in the mold cavity along the surface formed by the moveable mold member 16. In this regard, as shown in FIGS. 2 and 3, the laminate-type material is provided in a size and shape which is larger than the size or dimensions of the mold cavity. Once the molded part is formed and removed from the mold, the edges of the molded product are trimmed as necessary.

In accordance with the present invention, the plastic material is injected into the mold cavity 20 on the back or non-appearance side of the laminate material 32. The two mold members 14 and 16 are positioned to leave a small gap between them. The precise dimension of the gap is predetermined in accordance with the size and shape of the part to be molded, as well as the types of plastic material and laminate utilized, and the temperature and pressure of the process.

The plastic material which is injected into the mold cavity 20 through orifice 24 spreads out in the mold in all directions, but typically does not entirely fill the mold cavity. This is shown in FIG. 2, where a gap 38 is typically left between the outer edges of the mold cavity 20 and the outer edges of the amount of plastic material 36 injected into the cavity.

Once the plastic material has been injected into the mold cavity, pressurized gas is injected into the plastic material creating an internal void 40 in the plastic material. This is shown in FIG. 3. The gas material can be any gas material commonly used in the gas-assisted injection molding industry, and preferably is an inert gas, such as nitrogen.

The injection of the gas material into the mold cavity 20 form a hollow void 40, as shown in FIG. 3, and pushes the plastic material 36 into all of the corners and extremities of the mold cavity 20.

The gas is injected into the mold cavity through gas pin 42 as shown in FIGS. 1–3. The gas pin can be of any conventional type and any number of gas pin assemblies can be utilized with the present invention. The type of gas pin assembly and number of assemblies utilized typically depends on the size and configuration of the mold cavity and the size and shape of the resulting part or component to be produced.

Gas can be injected into the mold cavity by any conventional gas control and gas assist mechanism and process. The gas can be provided through a gas storage system and regulated in pressure and duration by the controller mechanism.

A schematic illustration of a laminate-type plastic article produced in accordance with the process described above is shown in FIG. 4. The molded part, only a portion of which is shown, includes a laminate material 32 on one surface with plastic material 36 molded and bonded to it. The gas produces a hollow chamber or cavity 40 in the molded part. Typically, an opening, such as channel 52 is provided in the molded product in order to provide an exit or vent hole for venting of the gas from the molded component.

In this regard, once gas is injected into the molten plastic material, creating internal void 40, the mold is closed under controlled conditions for speed and pressure. This causes a sharp increase in the internal cavity pressure as the gas is compressed. Thereafter, once the molded plastic part is self-supporting, the gas is vented from the molded component, such as through opening 52. The gas can also be vented, however, through a gas pin member 42, or in any other conventional manner.

Once the gas is vented or exhausted from the molded part, the mold 12 is opened by a movement of the moveable mold portion 16. Thereafter, the completed part 50 is removed from the mold cavity, particularly by the use of one or more ejector pins (not shown).

After the part 50 is molded, it is transferred to other work sites or work stations for further processing, including trimming and the like. At the same time, another piece of fabric or laminate-type material is positioned within the mold 12, and the cycle is repeated.

A flow diagram schematically depicting the present inventive process and system is shown in FIG. 7. In the process, fabric or laminate is first placed in the moving half of the mold covering the cavity or a predesignated area in the mold cavity. This is shown in Box 60. Then, the mold is closed to its preset position providing a mold gap. This is shown in Box 62. In this manner, the process provides low pressure laminate molding. Thereafter, molten plastic material or polymer is injected into the mold cavity against the laminate material to a predetermined volume. This is shown in Box 64. The volume can be less than the amount necessary to fill the mold cavity, although it could be sufficient to entirely fill the mold cavity.

Thereafter, gas is injected into the molten polymer material, creating an internal void 40 and forcing the polymer 36 into any non-filled areas of the cavity. This is shown in Box 66. The mold is then closed under controlled conditions for speed and pressure, as shown in Box 68. This causes a sharp increase in the internal cavity as the gas is compressed. Once the plastic part or product has sufficiently solidified, gas is vented from the molded component, as shown in Box 70. Finally, the mold is opened and the part is removed from the mold cavity. This is shown in Box 72.

A basic form of the inventive method or process is shown in FIG. 8. As a first step in the process (Step 80), the laminate is placed in the mold. Then, as shown in Step 82, the mold is closed to its pre-set gap position. The plastic is then injected into the mold cavity, as shown in Step 84. The gas is then injected into the plastic material, as shown in Step 86. Thereafter, the mold is closed, compressing the gas in the plastic part and integrally bonding the plastic material to the laminate material. This is shown in Step 88. Once the plastic has cooled, as shown in Step 90, the gas is vented from the molded component as shown in step 92. Finally, the mold is opened and the part removed, as shown in Step 94.

Figure 5:
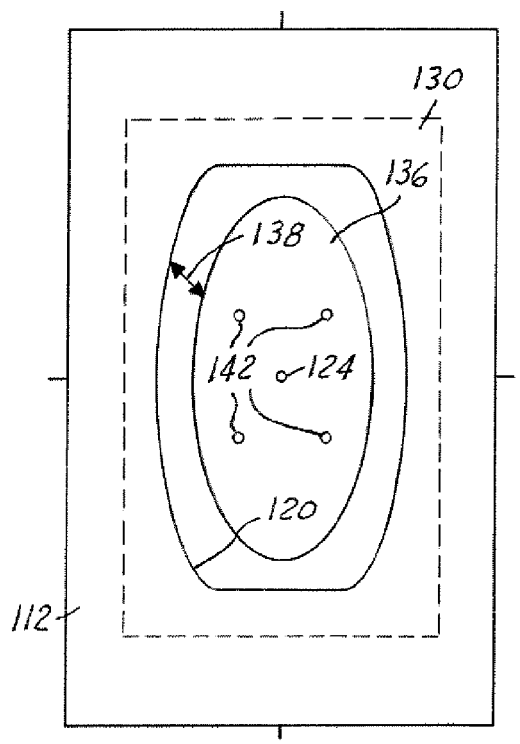
FIGS. 5 and 6 illustrate steps in another preferred embodiment of the present invention.
Figure 6:
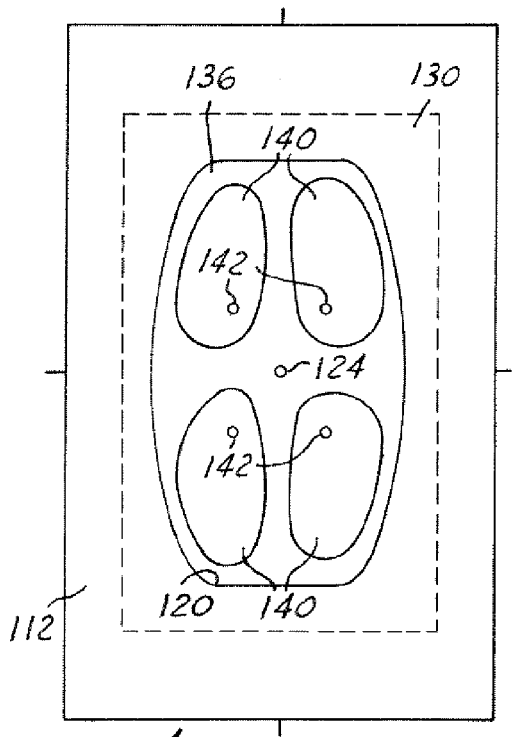

An alternate embodiment 100 of the present invention is shown in FIGS. 5 and 6. In this embodiment 100, the mold 112 consists of two mold members, similar to the mold members 14 and 16 described above. A cavity 120 is formed in the mold 112 and a fabric or laminate-type material 130 is positioned in the moveable mold member.

Thereafter, plastic is injected into the mold cavity 120 through orifice or opening 124. Again, similar to the situation with regard to opening 24 described above, the opening 124 in the embodiment shown in FIGS. 5 and 6 is preferably positioned substantially in the center of the mold 112.

A quantity of plastic material 136 is injected into the mold cavity onto the laminate material 130. This is shown in FIG. 5. Preferably, a gap 138 is left between the plastic material injected into the cavity 120 and the outer edges or extremities of the mold cavity 120.

Thereafter, gas is injected into the plastic material through a plurality of gas pin members 142. The injected gas forms a number of hollow portions or voids 140 in the plastic material 136. At the same time, the pressure of the gas forces the plastic material 136 to completely fill out the mold cavity and all of its corners, angles and extremities. This is shown in FIG. 6.

Thereafter, the remainder of the process for the embodiment shown in FIGS. 5 and 6, is the same as the embodiment described above with reference to FIGS. 1–4. As a first step, the mold is closed under controlled conditions, which increases the internal cavity pressure as the injected gas is compressed. Thereafter, after the plastic material has sufficiently solidified, the gas is vented from the mold component and the mold is opened so that the part can be removed.

The present invention provides increased design flexibility with regard to intersecting wall thickness ratios with low pressure molding applications. Also, the complexity and cost of the mold for producing laminate-type materials is reduced. The use of gas-injection techniques for laminate-type products allows increased thickness of the products without sink marks. The gas assist process also produces the internal voids or chambers which reduce the shrinkage in the thicker areas of the molded plastic component.

In addition, the present invention allows greater design flexibility for part geometries. The invention also allows for greater design flexibility in the backside features since visual defects on the backside of the part are reduced or eliminated. The invention also reduces the design constraints that are applicable with known processes in which the backside of the products are not made for being viewed.

The present invention also reduces the number of drops needed in manifold system by increasing the flow length of the plastic material without increasing the pressure. This also eliminates or reduces weld lines in the final molded parts.

While various embodiments of the invention have been shown and described, numerous variations and alternate embodiments will occur to those skilled in the art. Accordingly, it is intended that the invention be limited only in terms of the appended claims.

The invention claimed is:

1. A process for producing a plastic laminate article, the process comprising the steps of:
   providing a mold with a mold cavity;
   positioning a laminate material in said mold cavity;
   closing the mold to a predetermined gap;
   injecting plastic material into the mold cavity and onto the laminate material;
   injecting a gas material into the plastic material in the mold cavity;
   closing the mold;
   venting the gas from the plastic material; and
   opening the mold and removing the completed laminate article from the mold cavity.

2. The process as described in claim 1 wherein the mold has a moveable mold member and a stationary mold member, and wherein said laminate material is positioned in said moveable mold member.

3. The process as described in claim 1 wherein said mold cavity has shear edges around its perimeter.

4. The process as described in claim 1 wherein said laminate material is larger than said mold cavity.

5. The process as described in claim 1 wherein the quantity of plastic material which is injected into said mold cavity is sufficient to fill said cavity.

6. The process as described in claim 1 wherein said mold is closed under controlled conditions for speed and pressure.

7. The process as described in claim 1 wherein the closing of the mold compresses the gas which is injected into said plastic material.

8. The process as described in claim 1 wherein the plastic material is injected into said mold cavity substantially at the center of said mold cavity.

9. The process as described in claim 1 wherein said gas is injected into the plastic material at more than one location in said mold cavity.

10. The process as described in claim 1 wherein said injected gas forms one hollow void in said plastic material.

11. The process as described in claim 1 wherein said injected gas forms at least two hollow voids in said plastic material.

12. The process as described in claim 1 further comprising the step of trimming the edge of the produced article after it has been removed from the mold.

13. A method of producing a plastic article with a laminate material fixedly secured to it, said process comprising the steps of:
    positioning a laminate material in a mold cavity;
    injecting plastic material into said mold cavity and onto said laminate material;
    injecting a gas into said plastic material in said mold cavity to form at least one hollow void in said plastic material;
    allowing said plastic material to solidify forming a plastic laminate article;
    venting said gas from said plastic laminate article; and
    removing said plastic laminate article from said mold cavity.

14. The method as described in claim 13 further comprising the step of compressing said gas material in said plastic article.

* * * * *

UNITED STATES PATENT AND TRADEMARK OFFICE
CERTIFICATE OF CORRECTION

PATENT NO. : 7,182,904 B2 Page 1 of 1
APPLICATION NO. : 10/707591
DATED : February 27, 2007
INVENTOR(S) : Gregory A. Homann It is certified that error appears in the above-identified patent and that said Letters Patent is hereby corrected as shown below:

On the Title Page, Item (75) should read, Gregory A. Homann.

Signed and Sealed this

Seventeenth Day of July, 2007

JON W. DUDAS
*Director of the United States Patent and Trademark Office*